July 7, 1953    T. ROGATCHOFF    2,644,406
TRACTION MOTOR DOLLY

Filed Feb. 14, 1951    2 Sheets-Sheet 1

INVENTOR.
THEODORE ROGATCHOFF
BY
J wesley Everett

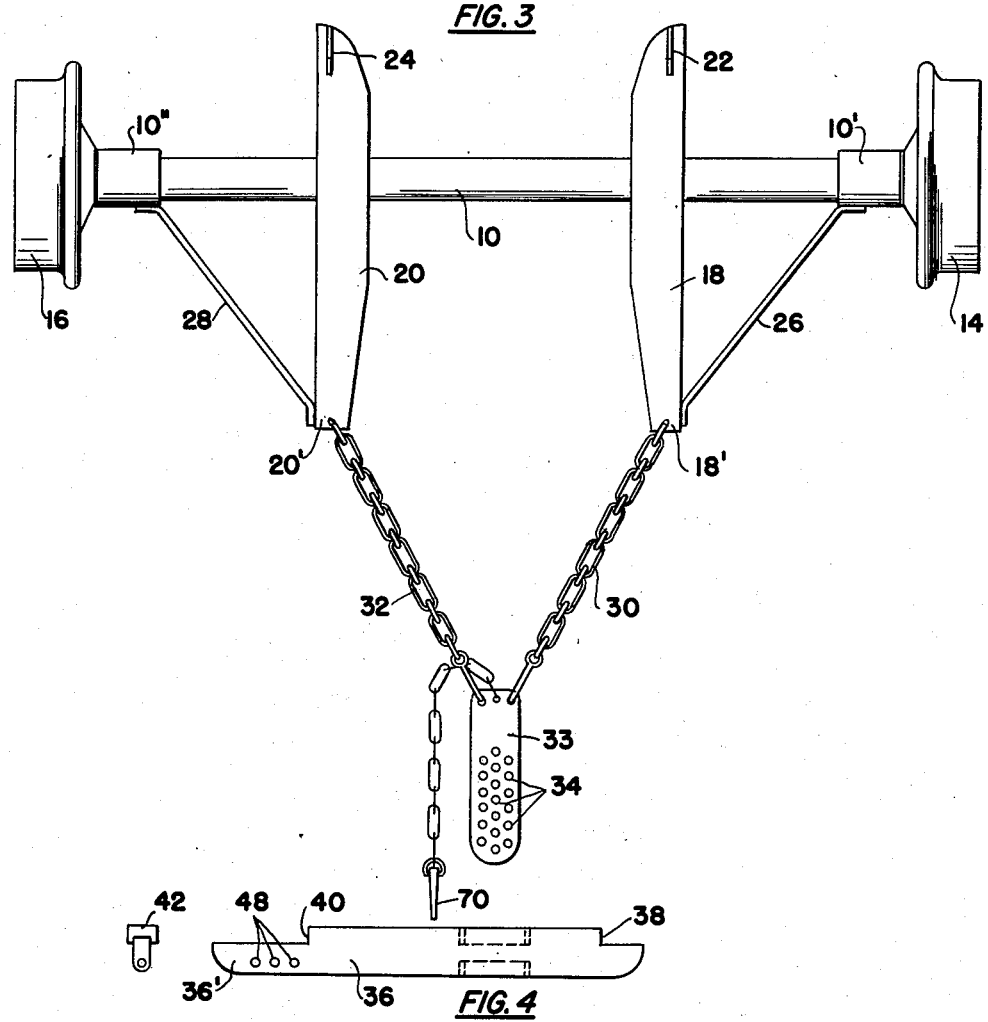
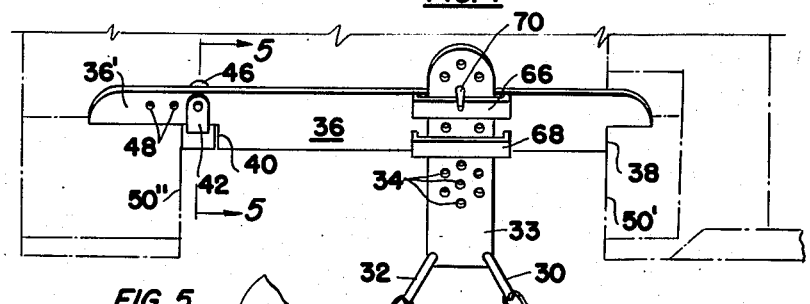
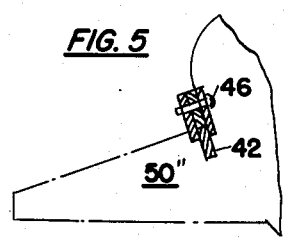

UNITED STATES PATENT OFFICE

2,644,406

TRACTION MOTOR DOLLY

Theodore Rogatchoff, Baltimore, Md.

Application February 14, 1951, Serial No. 210,880

3 Claims. (Cl. 104—32)

The present invention relates to a dolly or truck for handling traction motors of diesel or electrical railway locomotives. These motors are located beneath what is normally considered the floor of the locomotive or car and are connected directly to the driving wheel. Each motor is connected with an axle on which these driving wheels are fixed. When these motors are removed from the locomotive or car for repair or replacement they must be conveyed to a suitable place for repair or storage.

These units are comparatively heavy and bulky and are difficult to move and there have been many attempts to make the operation easier and safer for the personnel involved.

It is therefore the primary object of the invention to provide a simple and practical device which may be attached to these removed motors for moving them independently about the shop.

Another object of the invention is to provide a device that may be attached to any of the present known railway traction motors.

Still another object of the invention is to provide a device which may be easily clamped to the motor unit without the use of bolts.

While several objects of the invention have been pointed out, other objects and advantages of the invention will be apparent when the nature of the invention is more fully disclosed, which consists of the novel combination and arrangement of parts as shown in the accompanying drawings and described in the following detailed description in which:

Figure 3 is a plan view of the device.

Figure 4 is an enlarged view of a portion of the front elements.

Figure 5 is a view taken along the line 5—5 of Figure 4.

In the description like reference characters are used to refer to the same parts throughout the several views.

Figure 1:
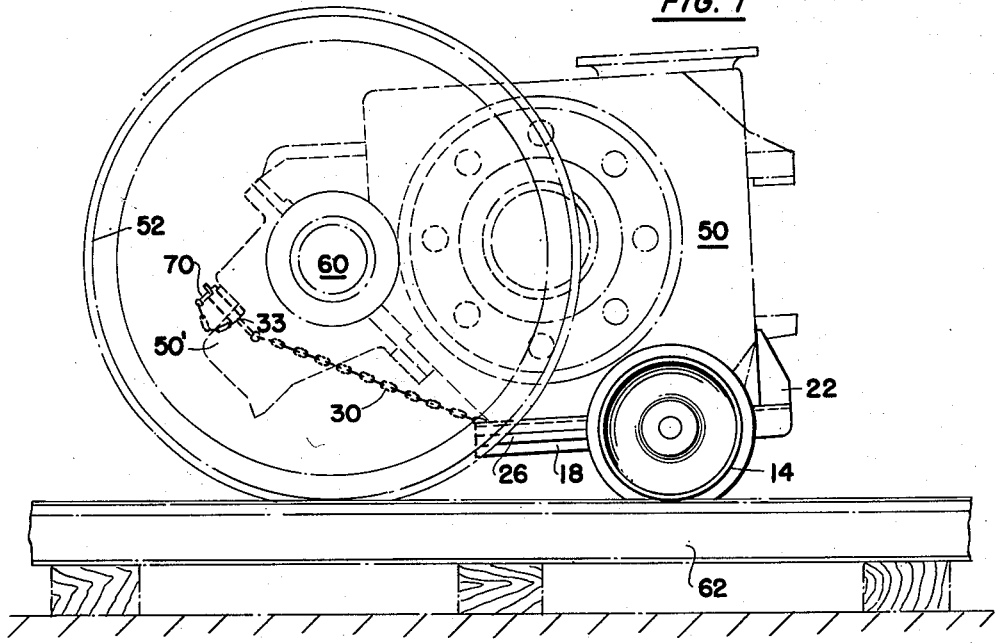
Figure 1 is a view in side elevation of the device.
Figure 2:
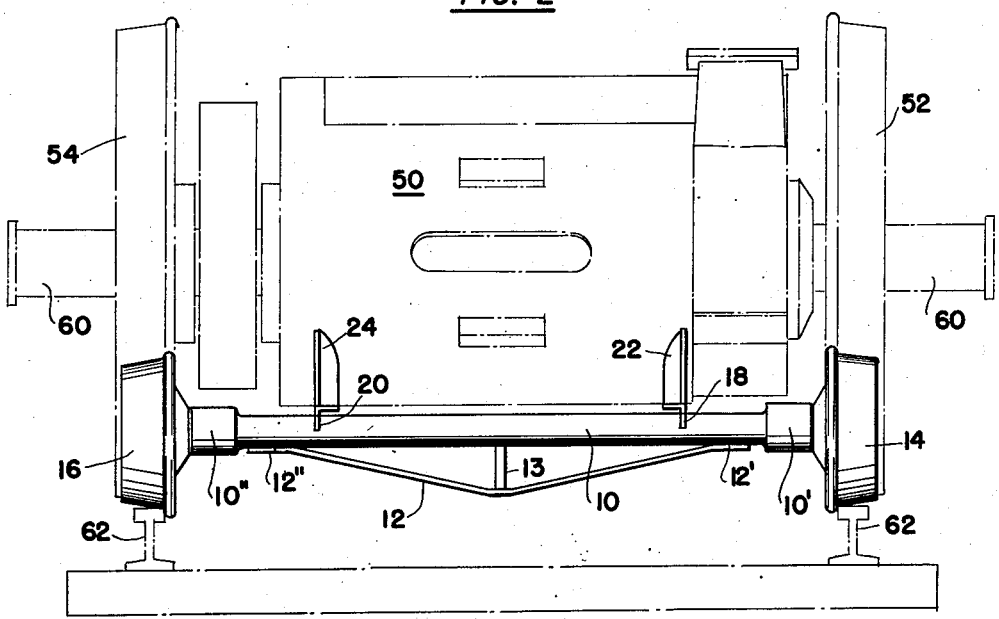
Figure 2 is a rear view of the same.

The device is generally referred to as a dolly or truck and comprises a tube, or stationary hollow axle 10, reinforced by a bar 12, which is attached below and at each end of the tube at 12' and 12" and supported adjacent the center of the axle by the member 13.

At the ends of the tube 10, there is provided two wheels 14 and 16, which are supported upon a rotating axle extending through the tube 10 and supported therein by roller bearings, not shown, adjacent the ends 10' and 10" of the tube.

On the upper side of the tube 10 and approximately half-way from the wheel members to the center of the tube are members 18 and 20 for supporting the motor unit. These members are arranged parallel to each other and at right angles to the tube or stationary axle 10. On one end of these members 18 and 20, which is regarded as the rear end, are upright members 22 and 24 extending upwardly perpendicular to the members 18 and 20 for contacting the motor casing. The front end of the members 18 and 20 are braced by the members 26 and 28, extending from the ends 18' and 20' of the members 18 and 20 to the tube 10 adjacent the wheels.

Secured to the front ends 18' and 20' of the supporting members are chains 30 and 32. The opposite ends of the chains are connected to a plate 33. The plate 33 is provided with a plurality of holes 34 for adjusting the plate relative to the bar 36. The bar 36 is provided with steps 38 and 40. The steps 38 and 40 are for the minimum width motors, and to accommodate larger motor units there is provided a movable step or bracket 42. The member 42 is movable and adjustable along the end portion 36', being held in a selected location by a pin 46, which is receivable in the holes 48 within the bar portion 36' for accommodating the wider motor units.

The dolly is constructed of strong, light material in order that it may be easily handled by a single individual.

The members 18, 20, 22 and 24 form a cradle for receiving the motor unit, one form of which is shown at 50 having driving wheels 52 and 54. The motor unit is positioned to one side of the axle 60 upon which the drive wheels are fixedly secured, therefore the major portion of the weight of the motor is to one side of the axle 60 and it is this end of the motor and motor casing which the dolly is adapted to support and will provide two extra wheels in addition to the drive wheels upon which the motor unit is supported. The wheels 14 and 16 of the dolly are preferably of the flanged type adapted to run on the rails 62.

When used, the motor unit including the drive wheels are first removed from the locomotive or car, as the case may be. When disconnected from the locomotive the dolly is placed under the motor casing as shown best in Figure 1. The members 22 and 24 of the cradle are placed snugly against the rear side of the motor casing. The front sections of the members 18 and 20 beyond the stationary axle 10 are substantially longer than the rear portion, and extend forward under the motor casing toward the axle 60 of the drive wheels 52 and 54. The bar 36 is then adjusted to fit between the two portions 50' and 50'' of the casing. The plate is then brought forward and inserted beneath the brackets 66 and 68 carried by the bar 36 forming a guide and retaining means for holding the plate in slidable relationship with the bar. The plate is inserted beneath the brackets until the chains are taut when a pin 70 is inserted through the appropriate holes 34.

After the dolly has been attached, the motor unit may be wheeled along the tracks with very little effort. Because there are no bolts or brackets to fasten the unit the danger of accident is greatly reduced. Also it is not necessary to have particularly formed braces or brackets to fit the various makes and designs of motor units. As all these units are equipped with standard bearing supports 50' and 50'', the adjustable bar 36 will fit all present known makes.

While the device is shown in a particular form, it is not intended as a limitation and the scope of the invention is best defined in the appending claims.

I claim:

1. A railway dolly for traction motor assemblies comprising a pair of low flanged wheels, an axle extending therebetween, a cradle carried on the said axle for supporting one end of the assembly, the rear portion of the cradle extending rearwardly from the axle for a distance greater than the radius of the wheels, the front portion of the cradle extending in front of the axle approximately twice the distance that it extends rearwardly of the axle, means extending upwardly from the rear end of the cradle for gauging the location of the assembly, a flexible tie connected with each side of and at the front end of the cradle and including a perforated plate, a horizontally adjustable bracket bar adapted to engage the opposite end of the assembly and means carried by the bar and said plate for adjustably securing the flexible tie thereto.

2. A railway dolly for traction motor assemblies, comprising a pair of low flanged wheels, an axle extending between the said wheels, a cradle carried on the axle for supporting one end of the assembly, the cradle comprising a pair of elongated parallel members supported upon the axle at each side of the center of the axle, the rear portion of the cradle extending rearwardly from the axle for a distance greater than the radius of the wheels, the front portion of the cradle extending in front of the axle approximately twice the distance that it extends rearwardly of the axle, means extending upwardly from the rear end of each parallel member and at right angles thereto for locating the assembly on the cradle, a flexible tie having one end connected with the front end of each of the parallel members, a horizontally adjustable bracket bar adapted to engage the opposite end of the assembly on adjustable means carried at the outer end of the flexible tie for engaging a receiving means carried by the bar.

3. A railroad dolly for supporting one end of motor assemblies of railway locomotives having a pair of supporting drive wheels rotatably carried adjacent one end of said dolly comprising a horizontal cradle consisting of a plurality of supporting bars arranged in a horizontal plane, an axle extending crosswise of said cradle and rigidly secured thereto, the said axle extending outwardly on each side of the cradle, a pair of low flanged wheels rotatably mounted on the outer ends of the axle, the wheels and cradle being of such height as to support one end of the assembly in its normal operating position, the rear portion of the cradle extending rearwardly from the axle for a distance greater than the radius of the wheels of said dolly, the front portion of the cradle extending in front of the wheel axle of said dolly of approximately twice the distance that it extends rearwardly of the axle, stop means extending upwardly from the rear portion of the cradle to locate and position the dolly supported end of the assembly, so that the axis of the low flanged wheels will be parallel with the axis of the drive wheels, holding means carried on the end of the cradle opposite the end carrying the stops adapted to engage a portion of the assembly adjacent the drive wheels for holding the cradle in its fixed position under the assembly.

THEODORE ROGATCHOFF.

References Cited in the file of this patent

UNITED STATES PATENTS

| Number | Name | Date |
| --- | --- | --- |
| 1,059,595 | Clark | Apr. 22, 1913 |
| 1,084,287 | Moore | Jan. 13, 1914 |
| 2,556,652 | Irwin | June 12, 1951 |